US008676853B2

(12) United States Patent (10) Patent No.: US 8,676,853 B2
Kasravi et al. (45) Date of Patent: Mar. 18, 2014

(54) SYSTEM AND METHOD FOR SOFTWARE REUSE

(75) Inventors: Kas Kasravi, W. Bloomfield, MI (US); Bhupendra N. Patel, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1936 days.

(21) Appl. No.: 10/375,331

(22) Filed: Feb. 27, 2003

(65) Prior Publication Data

US 2004/0172612 A1 Sep. 2, 2004

(51) Int. Cl.
*G06F 17/30* (2006.01)

(52) U.S. Cl.
USPC .......................................................... 707/792

(58) Field of Classification Search
USPC ......... 706/47, 46, 54; 717/101; 707/101, 3, 6, 707/792; 705/4
See application file for complete search history.

(56) References Cited

U.S. PATENT DOCUMENTS

| | | | | |
|---|---|---|---|---|
| 5,581,664 A * | 12/1996 | Allen et al. | ...................... | 706/46 |
| 5,632,022 A | 5/1997 | Warren et al. | | |
| 5,933,818 A | 8/1999 | Kasravi et al. | | |
| 6,081,798 A * | 6/2000 | Johnson et al. | .................. | 706/54 |
| 7,149,734 B2 * | 12/2006 | Carlson et al. | ..................... | 707/6 |
| 2003/0158760 A1* | 8/2003 | Kannenberg | ...................... | 705/4 |
| 2004/0128645 A1* | 7/2004 | Srivastava | ..................... | 717/101 |

OTHER PUBLICATIONS

"Using Case-Based Reasoning for Reusing Software Knowledge", by: Carsten Tautz and Klaus-Dieter Althoff, Published '97 http://www.iese.fhg.de/pdf_files/althoff_pub/iccbr97-crc.pdf.*

"Using Case-Based Reasoning for Reusing Software Knowledge", by: Carsten Tautz and Klaus-Dieter Althoff, Published 1997 http://download.springer.com/static/pdf/479/chp%253A10.1007%252F3-540-63233-6_488.pdf?auth66=1386787266_b0197eaf991faeb84b1d6e2410e7abcc&ext=.pdf.*

Matwin, S. et al., "Reuse of Modular Software with Automated Comment Analysis" *Software Maintenance*, 1994 Proceedings International Conference (IEEE Computer Scoiety), Sep. 19, 1994, pp. 222-231.

Ha, N. et al., "An Inference Mechanism Under Incomplete Knowledge Based on Rule Similarity Considering Viewpoint", *Knowledge-Based Intelligent Engineering Systems and Allied Technologies*, 2000, Fourth International Conference (IEEE), Aug. 30, 2000, pp. 750-755.

"Using Case Based Reasoning to Locate and Match Object Oriented Classes and Libraries," IBM Technical Disclosure Bulletin, vol. 37, No. 12 (IBM Corporation, New York), Dec. 1994, pp. 155-159.

PCT International Search Report for PCT/US2004/005856.

* cited by examiner

*Primary Examiner* — Apu Mofiz
*Assistant Examiner* — Chelcie Daye

(57) ABSTRACT

A method and system are presented for accessing existing software. The method includes maintaining a library of software profiles, creating a new software profile to be searched against the library, searching the library to locate profiles similar to the new software profile, and identifying existing software associated with such similar profiles. An exemplary system embodiment of the present invention includes a library of software profiles and associated software, a search engine or process, an interface which accepts user formulated desired software profiles and outputs software located in the search. In operation, a search engine finds software profiles similar to a user formulated desired software profile and the interface outputs software associated with such similar software profiles. In preferred exemplary embodiments, searching the library is accomplished via Case-Based Reasoning, where a similarity score between software profiles is a function of "matching" and "non-matching" weights for profile field values, and also accounts for "synonymal matching weights" which are managed by a synonyms table.

25 Claims, 4 Drawing Sheets

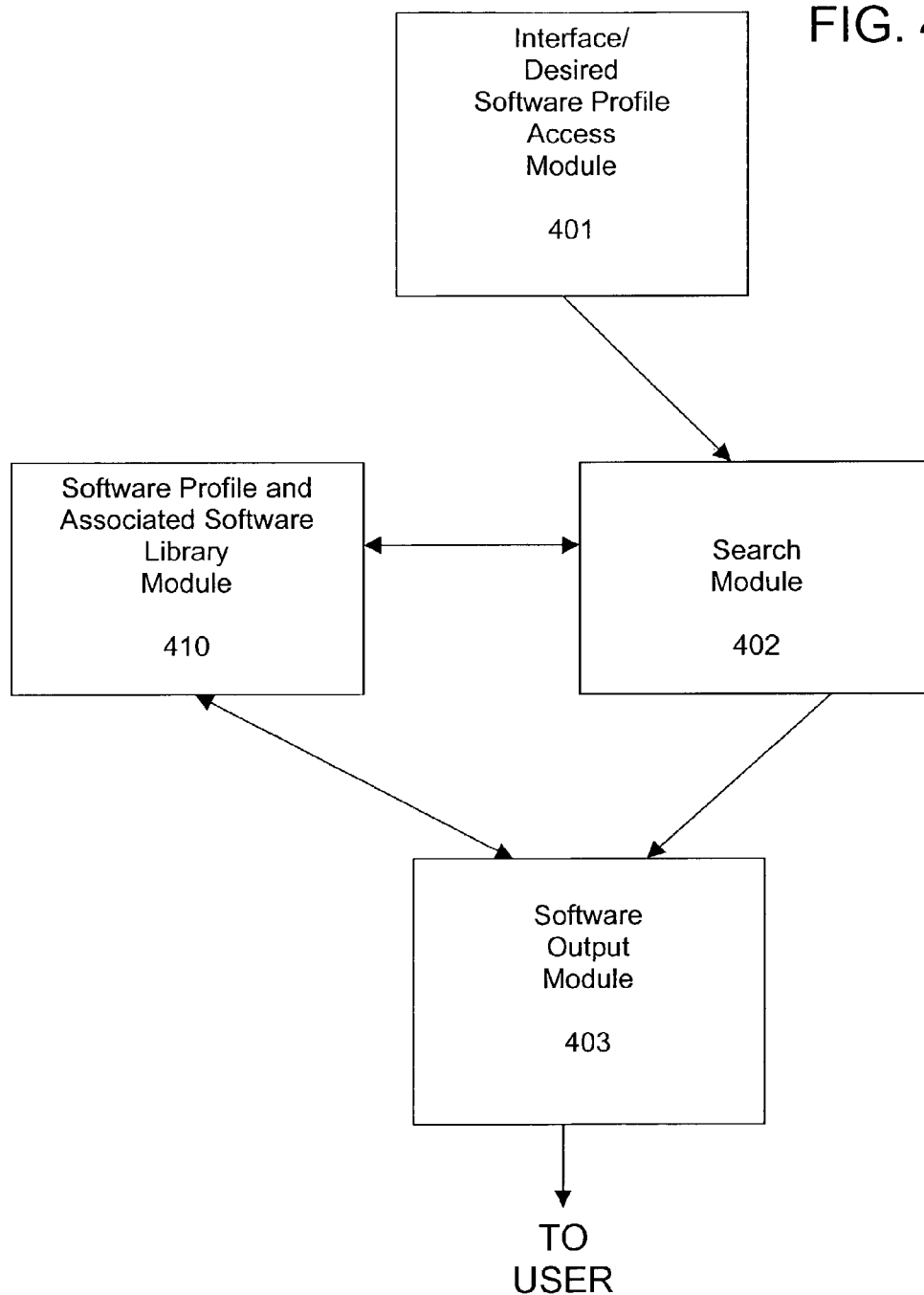

SYSTEM AND METHOD FOR SOFTWARE REUSE

TECHNICAL FIELD

The present invention relates to the application of artificial intelligence techniques to software development. More particularly, the present invention relates to a system and method for software reuse involving searching a library of software profiles for similarity with a user formulated profile for desired software.

BACKGROUND INFORMATION

Software development plays a significant role in the global economy. Large companies in the business of, for example, providing enterprise computing services and solutions generally have software application development programs involving significant annual expenditures. Notwithstanding the significant resources devoted to it, certain problems continue to plague software development. Such problems are well known, and include, for example, cost overruns, delays, bugs and errors, and maintenance, to name a few.

Many attempts have been made to address the problems associated with software development, and thus improve the software development process and its efficiency. Examples of such attempts include the System Life Cycle initiative of Electronic Data Systems ("EDS"), of Plano Tex., as well as the Software Engineering Institute—Capability Maturity Model (SEI-CMM) undertaken within the software industry. One problem that has not been fully addressed, however, is redundancy.

As can be appreciated, a better understanding of existing software can aid in the development of future software. In fact, if it were possible to do so, a large amount of existing software could be used as analogues or models for solving related or similar problems in new software. Moreover, many lines of existing code could be used as-is, or with minor additions, as part of new software applications. Traditionally, however, software developers do not reuse significant amounts of existing software. They thus spend much of their time creating and documenting new code. The comments provided with software code, as well as the code itself, can often provide much insight into the purpose, design, and characteristics of the software. The same is true for manuals and other documentation provided with such software. Nonetheless, manually reading extant software and its associated documentation for useful models is often prohibitively time consuming. It is therefore not attempted on a large scale.

In sum, although software development entities could utilize the vast resources hidden in existing software maintained by their organization, they rarely do so. Event though useful code could be found in current or past applications, or residing on one or more files on a given software developer's or computer engineer's computer within an organization, the conventional method currently used to exploit these hidden resources is extremely low-tech: word-of-mouth.

To illustrate, the following is an example of the conventional approach to using existing code in software development. Assume that a software developer or a computer engineer has an application which she is working on. She desires to write some code to implement a given functionality within that application. She is generally aware that, although some of the inputs and outputs may be different, the general functionality she desires to implement is very similar, if not identical to, functionalities that have been implemented in similar code by her present or former colleagues. Such old code may be, for example, in a different coding language (e.g., Fortran, Cobol, C/++, Pascal, or Java) but implementing the same function as is presently desired. For example, the existing code could assume a 16-bit File Allocation Table ("FAT") as opposed to a desired 32-bit FAT, or be a computer diagnostic tool for reading and processing digital radiological images specific to an older modality as opposed to a desired newer one. In each of these examples, simply adapting pre-existing old code could expedite the current software coding requirement.

Nonetheless, in the example discussed above, since there is neither a central search mechanism nor a central archive in which all software within her organization is automatically categorized and archived for easy retrieval, the software developer probably either (a) queries her current colleagues "Do you have any code that would do XYZ?" or (b) sends an email querying her department or the overall company seeking the same information. If one of her colleagues happens to recall similar code, he or she may so inform her orally or via email.

Beyond such word of mouth methods, there is generally no intelligence that bridges the gap between someone who needs specific code at a given moment and someone who happens to have the code sitting on their hard drive. Few, if any, of her colleagues will take the time to thoroughly search even their own files, let alone undertake a departmental or company-wide search. Thus, left with few remaining choices she simply takes the path of least resistance and re-invents the wheel.

While there are a few websites which maintain modest software libraries, the contents of these libraries tends to be very limited, and the software stored there is only accessible by browsing. Such websites simply do not contain enough code to be generally useful, and offer no intelligence or assistance to a user who is trying to locate a particular kind of software to accomplish particular defined functionalities. It is simply inefficient to browse through lines of code online trying to find a particular function in a "codestack."

Thus, beyond word of mouth efforts, existing methods of software reuse are limited to manually browsing and searching, for example, databases, class libraries and/or web pages for similar software components. This method is very tedious, is limited to a small number of software components, and is generally not performed.

While the notion of "software reuse" has been discussed for many years in connection with software components, class libraries or objects, despite all such efforts, a comprehensive technical solution does not yet exist to assist with the efficient reuse of software. As a result, many existing software components are unnecessarily re-developed and re-tested. This results in wasted time and money as well as risking quality problems.

What is needed in the art is a system and method which facilitates the large scale storing, searching for and accessing of pre-existing software.

SUMMARY OF THE INVENTION

A method and system are presented for accessing existing software. The method includes maintaining a library of software profiles, creating a new software profile to be searched against the library, searching the library to locate profiles similar to the new software profile, and identifying existing software associated with such similar profiles. An exemplary system embodiment of the present invention includes a library of software profiles and associated software, a search engine or process, an interface which accepts user formulated desired software profiles and outputs software located in the search. In operation, a search engine finds software profiles similar to a user formulated desired software profile and the interface outputs software associated with such similar software profiles. In preferred exemplary embodiments, searching the library is accomplished via Case-Based Reasoning, where a similarity score between software profiles is a function of "matching" and "non-matching" weights for profile field values, and also accounts for "synonymal matching weights" which are managed by a synonyms table.

BRIEF DESCRIPTION OF THE DRAWINGS

FIG. 4 depicts an exemplary modular software program implementing an exemplary embodiment of the method of the present invention.

DETAILED DESCRIPTION OF THE DRAWINGS

Figure 1:
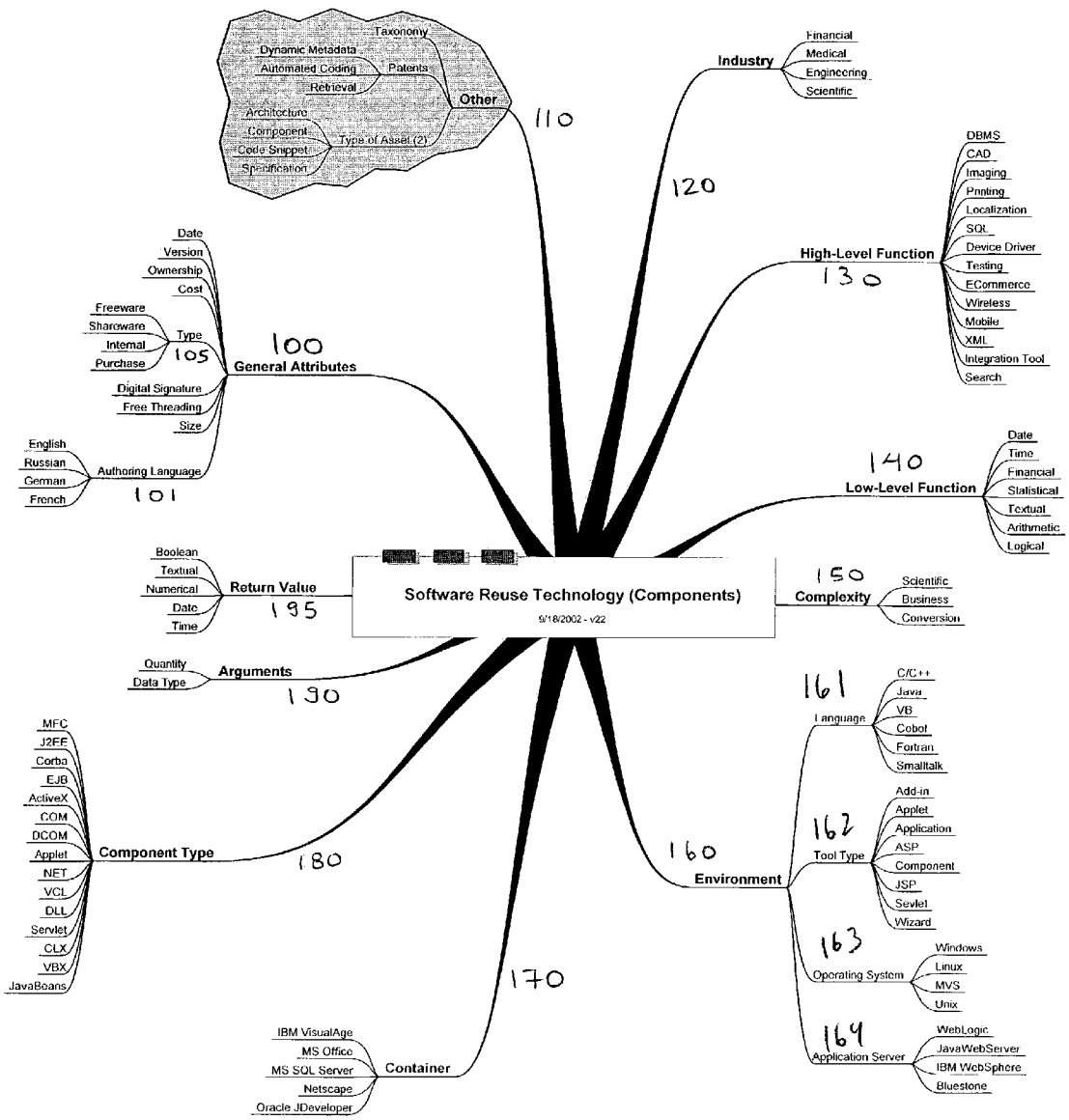
FIG. 1 illustrates an exemplary software taxonomy according to an embodiment of the present invention.

The system and method of the present invention include a methodology and tool for the reuse of existing software. As described above, in order to reuse software, an existing software library can be maintained in a data structure that allows the library to be searched and the software to be retrieved. In exemplary embodiments of the present invention, the actual software stored in the library is not what is searched; rather, profiles of such software can be created and searched. Software profiles can be created from software by, for example, a semantic analysis of the software in light of a given classification system or taxonomy. A method and system for such semantic analysis of software is described U.S. Ser. No. 10/357,329, entitled "SYSTEM AND METHOD FOR SEMANTIC SOFTWARE ANALYSIS," filed on Feb. 3, 2003 (U.S. Publication No. 2004/0154000). This application (the "Software Analysis Application") is hereby fully incorporated herein by reference.

For ease of illustration, the term "software" is understood to include file names, actual software code, inline comments, as well as any supplemental and/or additional documentation. An individual "piece" of software, such as a program or a portion thereof, will be referred to herein as a software "composition." In exemplary embodiments, software profiles can be based on a software "taxonomy". A software taxonomy is a hierarchical classification system which provides a common language to functionally describe software compositions, both existing and desired. "Desired software" is understood to refer to software which has been conceptualized as to function and general structure, but not yet written. As is known in the art, a taxonomy is a system of classification that facilitates a conceptual analysis or characterization of objects. A software taxonomy thus allows for the characterization of software.

In searching a library for existing software, a software developer/user can specify the attributes/features of her desired software in a "desired software profile." Such desired software profile can be formulated, for example, in a system-specific defined format, such that a system search algorithm can easily compare the desired software profile with existing software profiles stored in a system library. In exemplary embodiments of the present invention, the software profiles stored for existing software can be created in the same, or substantially similar, system-specific defined format. Such existing software profiles can be, in exemplary embodiments of the present invention, created using a software taxonomy such as, for example, that provided in FIG. 1. Such software profiles can be formulated in any desired manner, a particularly useful approach being the one fully described in the copending Software Analysis Application.

Software Taxonomies

A software taxonomy thus provides a set of criteria by which software programs can be compared with each other. Using a software taxonomy, software can be assigned a value for each category in the taxonomy that is applicable to it, as described more fully below. For ease of illustration herein, a taxonomy is spoken of as containing "categories." When these categories are presented in a given software profile format, they are generally referred to as "fields," where each field has an associated "value." For example, "Type" and "Programming Language" could be exemplary taxonomical categories and thus fields of a software profile. Their respective values in a software profile could be, for example, "Scientific" and "Fortran."

In preferred exemplary embodiments a software taxonomy can be flexible, allowing its categories to be changed or renamed over time. Software profiles created at different times using a flexible taxonomy can thus have non-identical but semantically similar fields and/or values, and thus search rules for comparing two software profiles whose fields and/or values are different but similar would need to be implemented. Profiles created using a flexible taxonomy are said to be "non-rigid." Rigid profiles assume that only an element by element comparison is valid. Thus, rigid software profiles are considered as dissimilar unless each and every field for which one has a value is valued in the other. Non-rigid software profiles can still be compared on the basis of those fields which are valued in each, ignoring those fields which are valued in one profile but not in the other. Thus, non-rigid software profiles can be compared, and a mutual similarity score calculated, even (a) where a given set of fields is not identical between the two profiles, but only semantically equivalent, or (b) where the two profiles have identical fields with different, but semantically equivalent or similar, values. This latter functionality is effected by means of synonymal matching weights, as described more fully below.

An Exemplary Software Taxonomy

Turning to the exemplary taxonomy of FIG. 1, there are 11 major headings, or top level categories. Taxonomies are usually arranged in a class hierarchy, as is the taxonomy of FIG. 1. In general, the higher the level of a category, the more general it is and the lower the level, the more specific. The top level categories in the taxonomy of FIG. 1 include "General Attributes" 100, "Other" 110, "Industry" 120, "High-Level Function" 130, "Low-level Function" 140, "Complexity" 150, "Environment" 160, "Container" 170, "Component Type" 180, "Arguments" 190 and "Return Value" 195. Each top level category is further divided into two or more subcategories. Each top level category is depicted as a main branch of the taxonomy, with smaller branches branching off from it. Using such a taxonomy, a given software composition can be categorized and described.

In the taxonomy of FIG. 1, some sub-categories are further divided into sub-subcategories. This three-tiered hierarchical structure of the exemplary taxonomy of FIG. 1 can be seen, for example, with reference to the top level category "General Attributes" 100. Under "General Attributes" 100 there appear eight subcategories, including "Date", "Version", "Ownership", "Cost", "Type", "Digital Signature", "Size", and "Authoring Language". As well, within each of the subcategories "Type" and "Authoring Language", there are four sub-subcategories, respectively.

Thus, the "Type" subcategory in the "General Attributes" 100 top level category is further divided into sub-subcategories of "Freeware", "Shareware", "Internal", and "Purchase". Similarly, the "Authoring Language" subcategory of the "General Attributes" 100 top level category also has four sub-subcategories, namely "English," "Russian," "German," and "French."

In general a taxonomy supplies the fileds and their possible values for a given software profile. It is noted that in the exemplary taxonomy of FIG. 1 the lowest level categories are either subcategories or sub-subcategories. Most of these lower level categories, such as, for example, "Engineering" or "Scientific", which are each subcategories of the "Industry" 120 category, or "English" or "Shareware", which are respectively sub-subcategories of the "Authoring Language" 101 and "Type" 105 subcategories of the "General Attributes" 100 category, are specific enough to serve as the values of fields in a software profile. Such software profile fields would thus be defined by the respective subsuming categories (e.g., "Industry" 120), or subcategory (e.g., "Authoring Language" 101 or "Type" 105) of the lower-level terms. However, a few low-level categories (such as, e.g., subcategories "Date" or "Version") are more general and thus not specific enough to themselves serve as values for a software profile field. They would be represented as fields themselves in a given exemplary software profile, and each take a specific value (e.g., "Dec. 3, 2002" or "1.3") which must be supplied by the particular software composition being profiled.

The graphic presentation of the exemplary taxonomy of FIG. 1 illustrates the tree-like class hierarchy of a software taxonomy. Each of the general categories 100 though 195 is presented as a main branch of the taxonomy, whereas a subcategory such as "Language" 161, "Tool Type" 162, "Operating System" 163, and "Application Server" 164, all subcategories of the general heading "Environment" 160, are smaller branches, and each of those smaller branches in turn has its own set of yet smaller branches in a hierarchical taxonomical tree.

There is flexibility, in various exemplary embodiments, as to which taxonomy to use for creating software profiles for existing and desired software. Taxonomies tend to be domain specific. Thus, depending upon the type of software being profiled and searched for, one or more exemplary taxonomies can be used in a given system. For example, a set of categories that accurately describes one type of software, e.g., embedded systems for controlling household appliances, may have little applicability to another type, such as, e.g., a web browser. Additionally, as its experience with software profile searching and reuse grows, a given entity can, even within one software domain, modify and optimize its taxonomy over time.

There are numerous design choices available in the choice of a software taxonomy. In general there is a tradeoff between the degree of detail of a given taxonomy and the computing power required to create and search software profiles reflecting it. The more detailed a taxonomy, the more fields there are to populate in a corresponding software profile. Thus, where the number of software compositions to be maintained in a library is small to moderate, a lower resolution may be sufficient to adequately distinguish them, and a slightly less detailed taxonomy can be used. Alternatively, where there are a large number of software compositions to classify and mutually distinguish, a higher resolution may be desired, and a more detailed taxonomy can be used. The exemplary taxonomy of FIG. 1 would be said to be reasonably detailed.

It is assumed herein that a taxonomy was used to create a library, database or other related data structure which contains a software profile for each software composition stored in the system. Such software profiles can take many forms, such as, for example, semantic vectors, attribute lists, functional descriptions, Case Based Reasoning cases, or other attribute-based descriptions of software. Given such a library of software profiles, the present invention is directed to a system and method for searching such a library to locate existing software relevant to a user defined desired software profile.

Software Profile Format

A. Semantic Vectors

As noted, there are various ways of expressing a software profile according to an embodiment of the present invention. In exemplary embodiments of the present invention, software profiles can be automatically searched. Thus, in exemplary embodiments, a software profile can be formatted as a semantic vector. The components of the vector can be, for example, categories of the taxonomy. Thus, an exemplary taxonomy with N categories and subcategories that are used as fields could map to a N×1 semantic vector. Each component of the vector (i.e., field of the software profile) could have a value obtained from the semantic analysis of software, as described above. Such semantic vectors could be searched against to find those semantic vectors (representing existing software) "closest" to a user formulated desired software profile (representing the software she had to create). Closeness would be defined via some distance metric, as is known in the art.

B. Case Based Reasoning "Cases"

According to an exemplary embodiment of the present invention, a software profile could be in the form of a "case," to be stored in a "case library." As is known in the art, case libraries are used in connection with "case-based reasoning" systems. Case-Based Reasoning ("CBR") systems are artificial intelligence systems that seek to emulate human experiential recall in problem solving. They utilize libraries of known "cases." Each case comprises a "problem description" and a "solution." Case based reasoning is one manner of implementing knowledge-based systems.

A Generic CBR System

Figure 2:
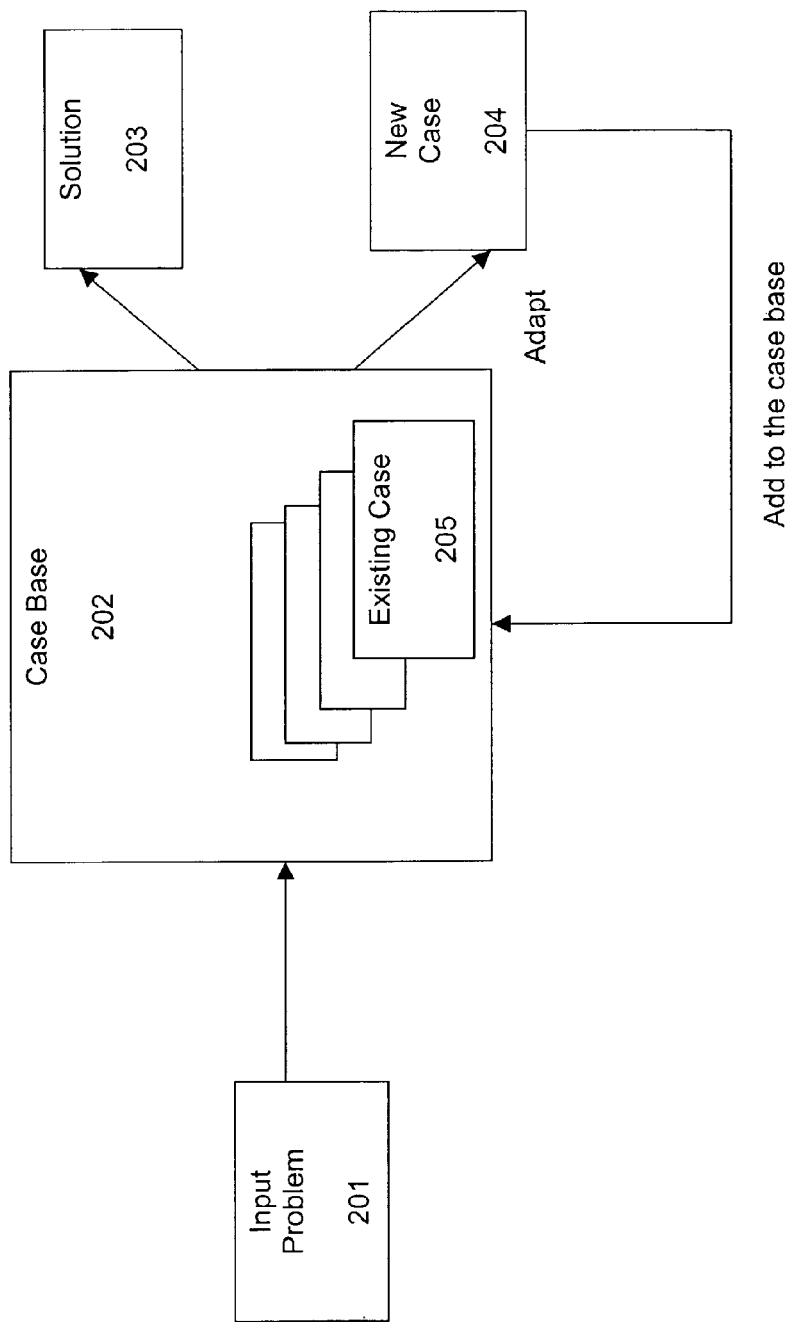
FIG. 2 illustrates an exemplary generic Case-Based Reasoning system.

FIG. 2 illustrates a generic CBR system that can be used in an exemplary embodiment of the present invention. An Input Problem 201 can be submitted to a Case Base 202. The Case Base 202 has a number of Existing Cases 205, in the aggregate similar to a human being's memory of her accumulated experiences. Cases are composed of "problem features" and "solutions." Each Existing Case 205 can be considered to be analogous to a human's recorded memory ("recorded" in the sense of internally, within the psyche). To find a solution to a novel Input Problem 201, the problem descriptions of the Existing Cases 205 are searched. One or more Existing Cases 205 are located whose respective problem descriptions "match" the Input Problem 201 with the highest "similarity score." A similarity score is a number that reflects how closely the overall values of the fields in an Existing Case's 205 problem description match those in the Input Problem 201 according to some metric. The more similar the features of the Input Problem 201 to those of a problem description in a given Existing Case 205, the more likely that the solution of such given Existing Case 205 will also work for the Input Problem 201. The CBR system thus outputs a Solution 203, which is an identical or a slightly modified version of the solution of the most similar Existing Case 205. This creates a New Case 204, e.g., a pairing of the Input Problem 201 with the generated Solution 203. The New Case 204 is added to the Case Base 202, thus enriching it.

For example, a CBR system could be built to store the accumulated knowledge of a team of plastic surgeons. Each case within the case base could comprise a real world problem that a team member has experienced, as well as the particular solution she developed. A system user, such as, for example, a young resident in plastic surgery faced with a challenging situation, could query the case base to find a case reciting a similar problem to the one she faces, in a similar manner as how a human, when trying to solve a given problem, recalls a similar situation and the actions he or others took at the time. Such case's solution could be relevant and useful to the young resident's current situation, thus passing on the "accumulated experience" embedded in the CBR system to her. To query the case base a user must formulate her "input problem" in a format that can be readily compared with the problem descriptions contained in the case base. Thus, her problem formulation needs to express her input problem as a series of values of certain categories, preferably the same categories (supplied by a common taxonomy) which were used in describing the various archived problems in their "problem descriptions" now stored in the case base.

In general, cases (as well as other types of software profiles) could be formatted, for example, as sets of attribute-value pairs, attribute-true/false pairs, attribute-type pairs, or attribute descriptor pairs, as is known in the art of CBR systems. For ease of illustration, a software profile case will be referred to herein as comprising fields with values, where such values can correspond to other categories in a taxonomy or data (such as, for example, strings, filenames, nouns, tokens, descriptors or types) extracted from the software.

Similarly to the plastic surgery example above, a CBR system can be used to search software profiles according to an exemplary embodiment of the present invention. According to such an exemplary embodiment, software profiles are formatted as cases. A software profile could correspond to the "problem description," and the software itself to the "solution," of a given case. Case creation can be achieved by populating appropriate fields in a case with the values extracted from a semantic analysis of software, as described above. Cases thus have fields corresponding to categories in a taxonomy. As noted, values for those fields either come from the taxonomy or from the software composition itself. Such a taxonomy can be similar to, but in robust systems need not be identical to, the taxonomy used to formulate the "input problem" of a new case profiling some desired software. Thus, existing cases stored in the CBR system, as well as any "desired software cases" would be "non-rigid" cases, as described above. The use of non-rigid cases allows for interoperability of a CBR system and any semantic software analysis systems used to populate it notwithstanding each system's ongoing modification and optimization of their respective taxonomies.

For example, suppose a user needs to write a new software program for a printer driver in C++ for an Epson™ color printer of a given model which is to run under Windows XP. Such user could compose an input problem for a novel case in the form of a desired software profile. The desired software profile could describe the various features of the desired software as values of fileds, where fields correspond to categories in an exemplary taxonomy. The CBR system can then find, as the most similar solution, a profile of an existing software composition which is a printer driver written in Assembler for a given Epson™ color printer to run under Windows 95. Hopefully, this existing software composition will be a useful model for the user.

CBR offers numerous advantages when used in the method and system of the present invention. For example, CBR resembles the human reasoning process, in that it is built around an experiential recall model. Moreover, CBR systems are easy to build and maintain. In addition, CBR has learning functionality. As a result, CBR systems search more efficiently with use and can thus can be an appreciating asset of an organization or entity. Thus, a software reuse system that locates existing software via Case-Based Reasoning will automatically get better at searching over time. This is because, for example, the weights assigned to matches, non-matches, and absences, and the values assigned to synonyms in the synonym tables (all such terms as more fully described below) can be modified and optimized over time.

As is known in the art, when searching through its case base, a CBR tool ranks every case in the case base for similarity with the new case, sorts the cases by rank, and outputs the top cases. Such ranking is generally by means of a similarity score, which assigns a particular "Matching Weight" when a common field of the new case and an existing case match, and a "Non-matching Weight" when a common field of the new case and an existing case do not. Thus, unlike standard database searching techniques, CBR takes into account both similarities and dissimilarities in the generation of a similarity score. Different case fields may have different matching and non-matching weights, to account for the relative importance of different features to the function or quality of a particular case. For example, in a software context, using the categories depicted in the exemplary taxonomy of FIG. 1, "Ownership" of a given program is generally much less relevant than the "Date" (of creation) of such program, and "Operating System" is generally much more relevant than the intended "Application Server." The more relevant fields can have higher matching and non-matching weights, thus allowing a relative weighting of the contribution of each field in a case to the overall similarity score. In an exemplary embodiment the overall similarity score can be the sum, over all common fields, of the matching and non-matching weights.

In exemplary embodiments of the present invention, a company-wide case base containing a case for each software composition within a particular organization or entity can be created. Alternatively, where a given entity has a large number of software compositions, its software can be separated into different domains and individual case bases created for each such domain. In such alternative exemplary embodiments, domain-specific taxonomies can be used to populate each case base and formulate new cases to be searched against it.

The creation of a case base can be resource intensive. This is because a software profile needs to be created for each existing software composition. For example, a case base could be manually created in known formats used in CBR systems. Alternatively, this process can be automated. As described in the Software Analysis Patent, various methods of taking the software maintained by an entity, applying a semantic analysis process to them, and automatically generating software profiles for each software composition exist. One of the formats in which such software profiles can be formatted is the case format suitable for use in CBR systems.

Once a case base describing existing software is created, a user can formulate a desired software profile as a new case to be used in searching against the case base. When using CBR, for example, such a new case can be formulated by specifying numerous fields and their desired values. Fields and their values can be, for example, categories and subcategories, subcategories and sub-subcategories, or sub-subcategories and their values, as respectively defined by a taxonomy. A CBR tool can then, for example, rank every case in the case base for similarity with the new case, sort the cases by rank, and output the cases most similar to the new case. Thus, according to an exemplary embodiment of the present invention, software desired by a user can be described by a set of fields and values comprising a case, and a CBR tool can locate and retrieve one or more existing software compositions within the case base that best meet her requirements. In exemplary embodiments of the present invention a user can, if desired, specify one or more values, or even a "wild card" value for a given field in a desired software profile. This feature allows for flexibility where a user is willing to accept more than one value for a given field. In such exemplary embodiments the system would assign a matching score for that field if any possible value is matched.

As noted, even when using non-identical taxonomies for creating a case base for existing software and for formulating desired software cases, by associating similarity of meaning as opposed to mere identity of words, a robust system can nonetheless operate. For example, when a semantic analysis of software is undertaken to create a case base whose fields are categories of a given taxonomy, a semantic analysis can access thesauri and other linguistic resources to identify synonyms. For example, a given program may implement an arithmetic function such as calculating the sum of a sequence of numbers from one to ten, and label its program type as "mathematical" in a header or accompanying documentation. A semantic analysis using a taxonomy which has a "Low-level Function" category with "arithmetic" as a possible value, can, through the use of a thesaurus or other synonym-finding process, associate the word "mathematical" in the program with the word "arithmetic" in the taxonomy and appropriately map the value "arithmetic" to the "Low-level Function" field in a case.

Conversely, if a given taxonomy is used in the semantic analysis of a self described "arithmetic" program, but the taxonomy does not have "arithmetic" as a possible value for a "Low-level Function" field, rather the closest taxonomical possible value being "mathematical," the semantic analysis can enter a value of "mathematical" in a "Low-level Function" field of its software profile output.

Similarly, when searching a desired software profile against a library of software profiles, synonyms can be considered. Thus, two values for a common field which are synonymous can be considered as having a very high, if not full, matching weight. In this fashion, it is possible to search against cases created using variant exemplary taxonomies (with corresponding variant values for various case fields) to obtain substantially identical search results. For example, if the "Low-level Function" field of a user formulated case has an "arithmetic" value, existing cases in the case base whose "Low-level Function" (or some synonym thereof) field has the value "mathematical" will assign a full or nearly full matching weight for that field. Such a "near matching score" can be referred to as a "synonymal matching weight." Variant exemplary taxonomies being used for a given system can ocurr, for example, when a taxonomy is expanded or adapted to better describe the software in a given library, resulting in one taxonomy being used to create an existing case and another variation of it subsequently used to formulate a user defined novel case.

Correlatively, in an exemplary system where the identical taxonomy is used, but the values of a given field are non-identical but synonymous in two given software profiles, in preferred exemplary embodiments a similarity scoring algorithm could capture the semantic equivalence of such synonyms by assigning a synonymal matching weight. Such a situation could result when the possible values of a particular software profile field are not specified by the taxonomy, such as the values for an exemplary low-level subcategory "Ownership" (a subcategory of "General Attributes" 100 in FIG. 1) where both, e.g., "EDS" and "Electronic Data Systems" are possible. This situation can also occur where the allowed values for a given taxonomical category are specified by the taxonomy but are numerous, and are allowed to be synonyms of each other, such as, for example, if an exemplary taxonomy allowed as possible subcategories for a "Low-level Function" category the subcategories "Financial," "Securities," and "Fixed Income Instruments."

An exemplary system implementing the methods of the present invention will next be described with reference to FIG. 3.

Figure 3:
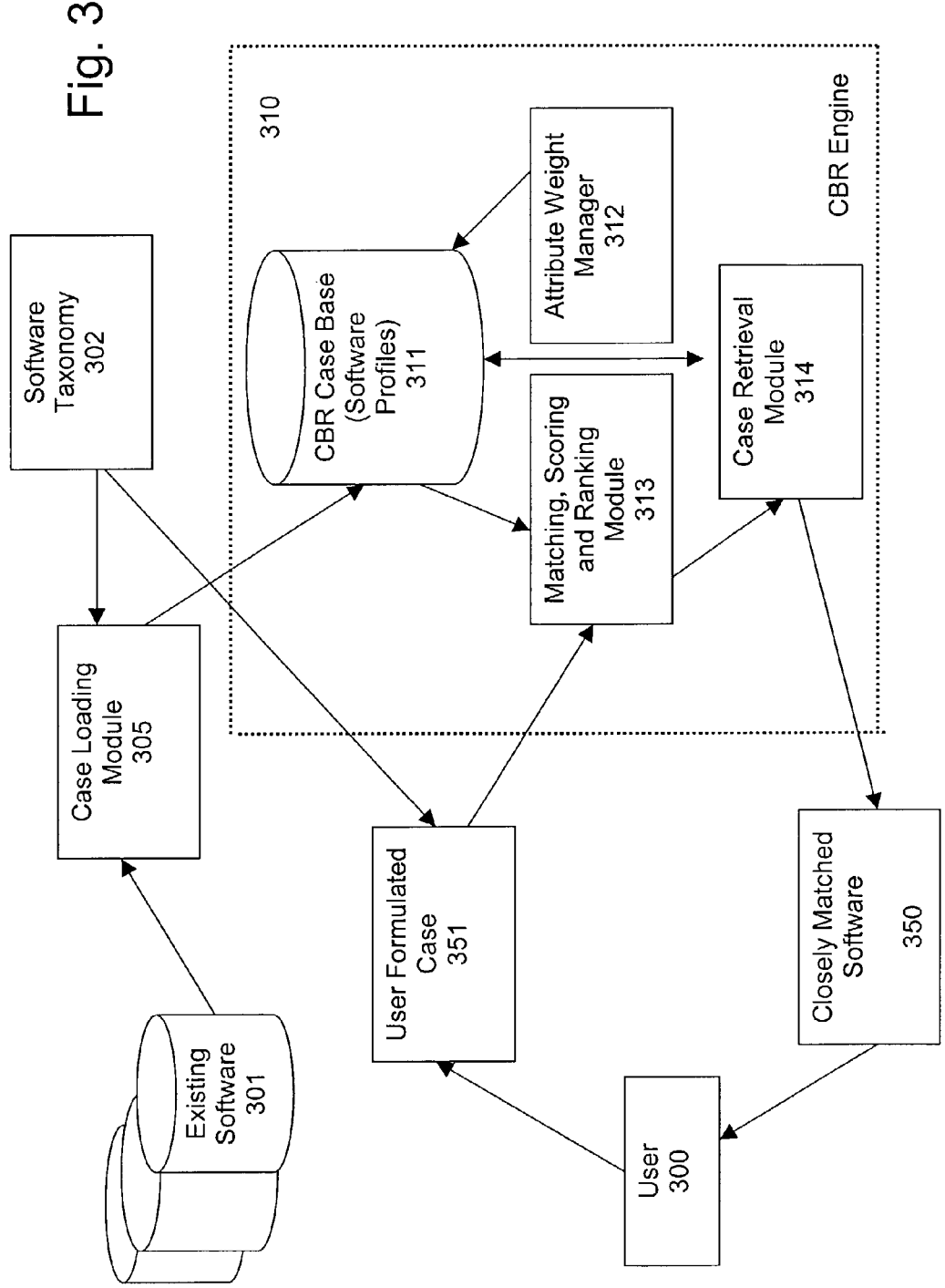
FIG. 3 depicts an exemplary process implementing a method according to an embodiment of the present invention.

The system of FIG. 3 assumes that using a taxonomy, such as, for example, that of FIG. 1, each existing software composition has been semantically analyzed (using, for example, either a manual classification process, or an automatic classification process as described in the Software Analysis Application) and has a corresponding software profile in the form of a case stored in a case base. As well, a new case (e.g., for the desired software) can be formulated, using the categories of the taxonomy (or even a substantially similar taxonomy), and a CBR tool will locate and retrieve one or more cases that best match it. Using the retrieved cases a user accesses the software compositions which they describe.

With reference to FIG. 3, a set of Existing Software 301 (e.g., a company's existing software programs) is stored in a library, database, or other organized and accessible data structure. In the depicted exemplary embodiment software profiles in the form of cases are automatically generated by a Case Loading Module 305 to create a CBR Case Base 311. The process of a Case Loading Module 305 operating on Existing Software 301 to create a CBR Case Base 311 can also be accomplished manually, or by other known methods. The CBR Case Base 311 is created using categories from a Software Taxonomy 302 for its fields and possible values.

A search engine, CBR Engine 310, which includes, for example, the Case Base 311 and associated searching modules 312-314, can now search the CBR Case Base 311 to locate Closely Matched Software 350 to a given User Formulated Case 351 created by a User 300 to profile desired software. In the exemplary embodiment of FIG. 3, a User Formulated Case also utilizes for its fields and values the categories of Software Taxonomy 302.

Continuing with reference to FIG. 3, within the CBR Engine 310 are, for example, software components consisting of, for example, a Matching, Scoring and Ranking Module 313, an Attribute Weight Manager 312, a CBR Case Base 311 and a Case Retrieval Module 314. The Attribute Weight Manager 312 maintains matching weights and non-matching weights for the various case fields. In preferred exemplary embodiments, the Attribute Weight Manager 312 also maintains absence weights and synonymal matching weights, as described below.

The Matching, Scoring, and Ranking Module 313 can accomplish a number of functions. In exemplary embodiments, this module retrieves each existing case from the CBR Case Base 311, and compares it to a User Formulated Case 351 to calculate a similarity score. It then ranks the various existing cases from Case Base 311 by their similarity score to find the existing cases that are most similar to the User Formulated Case 351.

Thus, the CBR Engine 310 ranks every case in the CBR Case Base 311 for similarity with the User Formulated Case 351, sorts these cases by rank, and outputs the top cases via the Case Retrieval Module 314. By associating such top cases with their corresponding software compositions in Existing Software 301, this results in a User 300 receiving Closely Matched Software 350, which can be used as an aid in implementing a desired new programming task. Such Closely Matched Software 350 could make the programming task easier, or even trivial if the match is sufficiently close. (In FIG. 3 the link between the Existing Software 301 and the Closely Matched Software 350 is not shown so as not to complicate the drawing.)

Synonymal matching will next be described in detail. In an exemplary CBR process according to the present invention, a value for a given field in an existing case may be an exact match against the user formulated case's value (matching) or not (non-matching). According to, for example, CBR logic, the score for the given field will be adjusted by the matching or non-matching weight for that field. In most cases this works rather well. However, it is possible for a case with a non-matching field to be sufficiently close to one with a matching field such that the case should nonetheless be identified to the User 300. This condition can arise, for example, from either similarities in the characteristics of two values or simply due to the two values being synonymous. For example, a software composition that was originally developed for the Windows 2000 operating system may run just as well on a Windows XP platform. The field in an exemplary case could be "Operating System," with values of "Windows 2000" and "Windows XP," respectively. These values are admittedly not identical, nor are they synonyms, but they are functionally close enough for all practical purposes. Therefore, the difference between "Windows XP" and "Windows 2000" should not cause a significant change in the similarity score for the "Operating System" field and thus the weighting should be nearly equal for a "Windows XP/Windows XP" full match as for a "Windows XP/Windows 2000" "synonymal match." In another case, the development platform could have been, for example, Windows 3.1. In this case, the original software written for Windows 3.1 would require re-compiling or additional modifications to be useable under Windows XP, but this effort is substantially less than if the original software were written for the MVS operating system. Thus, the differences in operating systems should be recognized and synonymal matching weights adjusted accordingly. A "Windows XP/Windows 3.1" synonymal match could have a value less than a "Windows XP/Windows 2000" synonymal match, but far higher than a "Windows XP/MVS" synonymal match.

To implement such intelligent functionality, in preferred exemplary embodiments of the present invention, a synonyms table can be developed. A synonyms table can be accessed by the system in implementing a software profile search, so as to catch similarities between software profile field values which are not literally identical, but which are semantically close or equivalent. In such an exemplary synonyms table, synonyms, along with associated values representing respective degrees of semantic closeness, are stored. For example, the following could be an excerpt of an exemplary synonyms table:

| Term 1 | Term 2 | Degree of Closeness |
|---|---|---|
| OS-Windows 2000 | OS-Windows XP: | 90% |
| OS-Windows 3.1 | OS-Windows XP: | 50% |
| OS-MVS | OS-Windows XP: | 5% |

The synonyms table comprehends similarities of terms, as well as their degree of closeness The degree of closeness (e.g., 50%) can, in exemplary embodiments, be multiplied by the full matching weight for the field to compute the change in similarity score. Such product can be described as a "synonymal matching weight." The terms in the synonyms table can be bi-directional (e.g., Windows XP and Windows 3.1 are synonymous regardless of which one is stated first).

For example, assume an "Operating System" field (163 with reference to FIG. 1) has a matching weight of 4.0 and an non-matching weight of −1, and the field's value in an existing software profile is, for example, "Windows 2000." If the target value in the user formulated software profile is, for example, "Windows XP," then without the use of synonyms, the change in similarity score for the field will be −1 (e.g., the non-matching weight, since the field values are not an exact match). Alternatively, with the use of synonyms in a matching score algorithm, the change in score will be +3.6(4× 90%=3.6), and thus semantically (and functionally) much more accurate.

In exemplary embodiments of the present invention interpretation of a synonyms table can be transitive, or implicitly defined. For example, "Windows 3.1" in the example presented above is synonymous with "Windows 2000," even though this relationship has not been explicitly declared in the synonyms table. The degree of closeness in such exemplary cases could be, for example, the product of the degrees of closeness for the transitive terms (e.g., 90%×50%=45%, therefore "Windows 3.1" and "Windows 2000" could be interpreted by an exemplary system as being synonymous with a degree of closeness of 45%).

In the exemplary embodiment of the present invention depicted in FIG. 3, synonym tables can be stored in the Attribute Weight Manager 312.

Given matching and non-matching weights, including the use of synonyms, in various exemplary embodiments of the present invention, there are various ways of handling what can be referred to as a partial match. This concept is related to the "non-rigid" taxonomy described above. A partial match occurs when, for example, a user formulated software profile has one or more fields in common with an existing software profile, but where there are fields in the user formulated desired software profile that have a value where the existing software profile does not, and/or fields where the existing profile has a value where the desired software profile does not. The design question is thus how to handle such a partial match. In general, a conventional database query does not allow for a partial match. If one of the instances being compared lacks a value for a given field, the database query interprets this as a non-match and disregards the entire instance as non similar. While this may make sense if the field in question is critical, or if having a value in that field is a sine qua non for functional similarity, in many instances having values in certain fields is peripheral to functionality, and need not be included in any similarity analysis.

Thus, in exemplary embodiments of the present invention, a partial match is simply ignored, not affecting the similarity score at all. If a field happens to be critical to the desired software, the user is left to discard any software composition located which has such a partial match. In such exemplary embodiments a user can be first provided a list of the most similar cases and can choose, through an interface, which of such cases she would like the associated software composition to be retrieved. Such exemplary embodiments are thus described as "partial match allowed, user filtered." In preferred exemplary embodiments a list of cases presented to a user can indicate which of them have partial matches to a desired software case to assist a user to quickly identify such cases.

In alternative exemplary embodiments of the present invention, a partial match can be assigned an "absence weight." Such "absence weight" can range from, for example, zero to a large negative number. In this way, an absence of a given field can be scored not at all (zero weight, thus resulting in no addition to the similarity score) as in the above described "partial match allowed" exemplary embodiment, or as a critical defect (substantially high negative number added to the similarity score, thus lowering the similarity score sufficiently to remove it form the top cases). Such absence weights can, in exemplary embodiments, be maintained by the Attribute Weight Manager 312 (with reference to FIG. 3).

Thus, the accuracy of an exemplary system according to an embodiment of the present invention can be improved by optimizing the various matching, non-matching, synonymal degrees of closeness and absence weights stored in the Attribute Weight Manager 312. Using user feedback, these weights can be adjusted to more accurately search for software in exemplary embodiments of the present invention. Such user feedback can be, for example, collected via various surveys and/or user rankings of the software compositions located by the system as to how well they met her desired software profile, or via an electronic form a system user can fill out after receiving her search results, where such form appears within a user interface when the search results are output. Such feedback can also be used to modify and optimize the various weights utilized by the system by, for example, manual evaluation and optimizing by system administrators, or alternatively, using some type of automatic process.

Instead of maintaining one set of weights, in preferred exemplary embodiments a number of sets of weights, as well as a number of synonym tables, can be maintained, each optimized for use with a certain type of software library, such as, for example, scientific software, legacy software, business software, etc. Such weight sets can be considered as "weight vectors," assigning a set of matching, non-matching, absence and synonymal matching weights to each field in a software profile.

A user can choose, for example, which weight vector she desires to be used in a given search, including a user defined weight vector which she may define at the time her user formulated case (or other desired software profile) is input, through a user interface.

In exemplary embodiments a taxonomy manager can be automated, using, for example, some type of genetic algorithm in conjunction with a scoring algorithm, causing the taxonomy to be automatically refined in response to user feedback from retrieval searches. Thus, in such exemplary embodiments, an exemplary system such as is depicted in FIG. 3 can become more efficient with use, inasmuch as the taxonomy used in creating software profiles can achieve a more and more optimal division of the "semantic plane" into various categories, adding detail where necessary and discarding redundant categories.

An example of the use and operation of the present invention follows. Assume that a user is writing a software program for a securities portfolio management application involving various arithmetical operations. She decides that it would be useful to have a basic function that calculates the sum of a given sequence of numbers. To search the software library of an exemplary system according to the present invention, she formulates a desired software case, an exemplary excerpt of which is depicted in Table A below:

TABLE A

| | | | | | | | |
|---|---|---|---|---|---|---|---|
| Exemplary Desired Software Case | | | | | | | |
| File Name | Programming Language | Low-level Functionr | Date | Operating System | Arguments | Complexity | Industry |
| sum.c | C++ | summation | 2002 | Windows XP | None | Business | Securities |

The formulated case is searched against the software profiles stored in the exemplary system, and the closest existing case found is, for example that whose excerpt appears in Table B:

TABLE B

| | | | | | | | |
|---|---|---|---|---|---|---|---|
| Exemplary Partial Case Excerpt | | | | | | | |
| File Name | Programming Language | Low-level Function | Date | Operating System | Arguments | Author | Industry |
| add.c | C | Arithmetic | Dec. 03, 2002 | Windows NT | None | Sheila Stone | Financial |

The software composition profiled in the case whose excerpt is depicted in Table B is shown in Table C below:

TABLE C

Exemplary Software Program

```
/* add.c
* a simple C program
*that adds a sequence of numbers
*from 1 to LAST and prints the sum. LAST is a globally definable
*final number in the sequence.
*
*Version 1.3
*December 3, 2002
*Programmer: Sheila Stone
*Ownership: Educational Programming, Inc.*/
#include <stdio.h>
#define LAST 10
```

TABLE C-continued

Exemplary Software Program

```
int main( )
{
int i, sum = 0;
for ( i = 1; i <= LAST; i++ ) {
sum += i;
} /*for loop to run through integers from 1 to LAST inclusive*/
printf("sum = % d\n", sum);
return 0; /*value that main returns*/
}
```

In the above example there is not an exact match between each field of the two case excerpts. Nor are all the fields in the excerpt from the user formulated case even found in the existing case ("Author" is not valued in the desired software profile, and "Complexity" is not valued in the existing case). Moreover, there is no real relationship to financial or securities applications in the code snippet located by the search, and the desired software is to run on Windows XP, not Windows NT. Nonetheless, by varying the starting value of "i" in the for loop of "main" as well as the value of the global variable "LAST", the located program can add the sum of any sequence of numbers, as desired. Thus, the located software is a useful reference at least, and can offer a savings in development time.

The system and methods of the present invention offer numerous benefits to those entities in the business of software development for external and internal use. The system and methods of the present invention offer a reduction in the software development cycle, which, in turn, results in significant savings of time, quality, and cost. Specific benefits are, for example, (a) reduction in application development costs; (b) reduction in application development time; (c) better positioning of such entities against the labor cost of off shore programming competitors; (d) higher quality applications (because software components in the existing software library have already been tested, and to the extent re-used pose no quality risk); (e) reduced unit testing time and reduction in maintenance costs; (f) reduction in software documentation; (g) more accurate software development estimation; and (h) lower application development risks.

Not only could a software development enterprise use the methods and system of the present invention to support the large scale development of software reuse within its own enterprise, but an exemplary system, according to an embodiment of the present invention, could be commercialized. Such a system could offer the capability of software re-use from a system library as a web service to clients involved in software development.

FIG. 4 depicts an exemplary modular software program of instructions which may be executed by an appropriate data processor as is known in the art, to implement an exemplary embodiment of the present invention. The exemplary software program may be stored, for example, on a hard drive, flash memory, memory stick, optical storage medium, or such other data storage device or devices as are known in the art. When the program is accessed by the CPU of an appropriate data processor and run, it performs, according to an exemplary embodiment of the present invention, a method for software reuse. The exemplary software program has, for example, four modules, corresponding to four functionalities associated with an exemplary embodiment of the present invention.

The first module is, for example, an Interface/Desired Software Profile Access Module 401, which allows for the formulation of a desired software profile by a user for use in searching against a library of existing software. This module also allows, for example, a user to set search parameters, such as choosing weight vectors and synonym tables. A second module is, for example, a Search Module 402, which, using a high level computer language software implementation of the functionalities described above, performs a search of the software profile library for similar profiles to the desired software profile. The Search Module 402 takes as inputs the desried software profile and search parameters form the Interface/Desired Software Profile Access Module 401, and also accesses the various software profiles from a third module, as next described.

A third module is, for example, a Software Profile and Associated Software Library Module 410. This module stores the existing software profiles as well as their associated software (or pointers thereto if such software is stored elsewhere, such as, for example, on a central company network). The Search Module 402 accesses the software profiles from the Software Profile and Associated Software Library Module 410 during the search, and passes a list of software profiles most similar to the desired software profile to a fourth module. This fourth module, for example, a Software Output Module 403, using the list received from the Search Module 402 accesses the software compositions associated with the software profiles on the list, and delivers them, with the list, to a user.

Modifications and substitutions by one of ordinary skill in the art are considered to be within the scope of the invention, such as, for example, using other search techniques, as well as other software attribute representation techniques, to accomplish the same output. Therefore, the invention is understood not to be limited in any way by the particular examples or exemplary method used herein to describe it. Thus, the scope of the present invention is not to be limited except by the following claims.

What is claimed

1. A method of identifying existing software components for reuse, comprising:
  maintaining a library of existing software profiles for corresponding existing software components, each existing software profile including a set of attributes associated with an existing software component, and each existing software profile created from a semantic analysis of the corresponding existing software component, the semantic analysis based at least in part on a software classification system, and wherein the set of attributes included in each of the existing software profiles is according to at least a first software taxonomy;
  creating a profile for desired software, the desired software profile defining a conceptualized software component and comprising a set of search criteria associated with the library of existing software profiles, wherein the search criteria include attributes according to a second software taxonomy different from the at least first software taxonomy;
  searching, by at least one processor, the library of existing software profiles to identify one or more existing software profiles similar to the desired software profile;
  identifying, by the at least one processor, one or more existing software components associated with the one or more similar existing software profiles identified in the search; and
  providing said identified one or more existing software components to a user.

2. The method of claim 1, where each existing software component includes at least one of file names, actual software code, inline comments, and any supplemental and/or additional documentation.

3. The method of claim 1, where each of the existing and desired software profiles are formulated as cases, and the searching of the library of existing software profiles is performed via case-based reasoning.

4. The method of claim 3, where said cases describe features using at least one of attribute-value pairs, attribute-true/false pairs, attribute-type pairs, and attribute-descriptor pairs.

5. The method of claim 1, where the existing and desired software profiles are expressed as semantic vectors, and said searching of the library of existing software profiles is effected via calculating a similarity score between the desired software profile and one or more of the existing software profiles.

6. The method of claim 1, where the software classification system is expressed in terms of the at least first software taxonomy.

7. The method of claim 6, where the attributes of said existing and desired software profiles correspond to categories arranged in a hierarchical structure, where the categories of the existing software profiles are defined by the at least first software taxonomy, and wherein the categories of the desired software profile are defined by the second software taxonomy.

8. The method of claim 3, where each case includes a corresponding set of attributes.

9. The method of claim 8, where searching of the library of existing software profiles includes assigning a similarity score to each existing case, wherein said similarity score quantifies a similarity between the attributes of the desired software case and those of each existing software case.

10. The method of claim 9, where the similarity score assigns a positive matching weight to a feature match and a negative matching weight to a non-match.

11. The method of claim 10, where the value of a given attribute need not be identical between a given existing case and the desired case for the given attribute to be interpreted as a match between the given existing case and the desired case.

12. The method of claim 11, where non-identical but synonymous attribute values are assigned a synonymal matching weight according to a synonyms table, where the synonymal matching weight is less than or equal to an identical matching weight.

13. The method of claim 9, where when the desired software case has a value for a given attribute, and an existing case being compared to it has no value for given attribute, at least one of the following occurs:
the given attribute is ignored in the calculation of a similarity score, having no effect on said score; or
a defined absence weight is assigned, where said absence weight ranges form zero to some negative number.

14. A system for accessing software, comprising:
a library of existing software profiles and associated existing software components, each existing software profile including a set of attributes associated with an existing software component, and each existing software profile created from a semantic analysis of the corresponding existing software component, the semantic analysis based at least in part on a software classification system, and wherein the set of attributes included in each of the existing software profiles is according to at least a first software taxonomy;
at least one processor;
a search engine executable on the at least one processor to:
create a profile for desired software, the desired software profile defining a conceptualized software component and comprising a set of search criteria associated with the library of existing software profiles, wherein the search criteria include attributes according to a second software taxonomy different from the at least first software taxonomy;
search the existing software profiles of said library to identify one or more existing software profiles similar to the desired software profile; and
identify one or more existing software profiles as a result of said search, each of the one or more identified existing software profiles associated with a corresponding existing software component; and
an interface to accept the desired software profile and to output one or more existing software components associated with the one or more identified existing software profiles.

15. The system of claim 14, where each of said existing software components includes at least one of file names, actual software code, inline comments, and any supplemental and/or additional documentation.

16. The system of claim 14, where said existing and desired software profiles are expressed as cases, and said searching of the library of existing software profiles is effected via case-based reasoning.

17. The system of claim 14, where the search engine is configured to assign a positive matching weight when a given attribute's values in the existing and desired software profiles match and a negative matching weight when the given attribute's values in the existing and desired software profiles do not match.

18. The system of claim 17, wherein the value of a given attribute need not be identical between a given existing case and the desired case for the given attribute to be interpreted as a match between the given existing case and the desired case.

19. The system of claim 18, wherein non-identical but synonymous attribute values are assigned a synonymal match weighting according to a synonyms table, and wherein the synonymal matching weight is less than or equal to an identical matching weight.

20. The system of claim 14, wherein the interface includes a user interface configured to allow a user to perform at least one of: formulate the desired software profile, effect the searching and retrieval of existing software components using said desired software profile, select a weighting vector profile to be used for a search, select a synonyms table, view search results, receive existing software components, and input user feedback.

21. The system of claim 14, where said search engine includes an attribute weight manager configured to store weights for at least one of matching, non-matching, synonymal, and absence occurrences used in generating a similarity score between an existing software profile and the desired software profile.

22. The system of claim 21, where said attribute weight manager is configured to store one or more weighting vectors, each corresponding to a different search profile.

23. A computer program product comprising a computer usable medium having computer readable program code embodied therein, the computer readable program code in said computer program product upon execution causing a computer to:
maintain a library of existing software profiles and linked existing software components, each existing software profile including a set of attributes associated with the linked existing software component, and each existing software profile created from a semantic analysis of the linked existing software component, the semantic analysis based at least in part on a software classification system, and wherein the set of attributes included in each of the existing software profiles is according to at least a first software taxonomy;

accept a desired software profile, the desired software profile defining a conceptualized software component and comprising a set of search criteria associated with the library of existing software profiles, wherein the search criteria include attributes according to a second software taxonomy different from the at least first software taxonomy;

search the library of existing software profiles to locate existing software profiles similar to said desired software profile;

output one or more existing software components linked to said one or more similar existing software profiles identified in the search; and provide said outputted one or more existing software components to a user.

24. The system of claim 14, wherein each of the desired and existing software profiles includes attributes corresponding to categories of a software taxonomy, wherein the categories are arranged in a hierarchical structure, wherein the categories of the desired software profile are according to the second software taxonomy, and wherein the categories of the existing software profiles are according to the at least first software taxonomy.

25. The computer program product of claim 23, wherein each of the desired and existing software profiles includes attributes corresponding to categories of a software taxonomy, wherein the categories are arranged in a hierarchical structure, wherein the categories of the desired software profile are according to the second software taxonomy, and wherein the categories of the existing software profiles are according to the at least first software taxonomy.

* * * * *